United States Patent [19]
Wright et al.

[11] Patent Number: 5,261,388
[45] Date of Patent: Nov. 16, 1993

[54] COOKING GRILL

[76] Inventors: Ivan M. Wright; Mary A. Wright, both of 4814 W. Pendleton Pl., Peoria, Ill. 61615

[21] Appl. No.: 880,155

[22] Filed: May 5, 1992

[51] Int. Cl.⁵ .................... A47J 37/00; A47J 37/04
[52] U.S. Cl. .................... 126/41 R; 126/41 B
[58] Field of Search ............... 126/39 R, 41 R, 91 R, 126/41 A, 41 B, 41 C; 99/390

[56] References Cited

U.S. PATENT DOCUMENTS

| | | | |
|---|---|---|---|
| 1,541,472 | 6/1925 | Born | 126/41 B |
| 1,747,325 | 2/1930 | Schey | 126/41 B |
| 3,140,651 | 7/1964 | Barnett | 126/14 X |
| 3,267,924 | 8/1966 | Payne | 126/41 R |
| 3,334,620 | 8/1967 | De Werth | 126/41 R |
| 3,757,765 | 9/1973 | Yamada | 126/41 R |
| 4,317,441 | 3/1982 | Berg | 126/41 R |
| 4,561,418 | 12/1985 | Cairns | 126/41 R |
| 4,627,410 | 12/1986 | Jung | 126/41 R |
| 4,850,333 | 7/1989 | Dellrud et al. | 126/41 R X |
| 4,901,705 | 2/1990 | Takata et al. | 126/41 R |
| 5,163,359 | 11/1992 | McLane, Sr. | 126/41 R X |

FOREIGN PATENT DOCUMENTS

| | | | |
|---|---|---|---|
| 570022 | 12/1957 | Italy | 126/41 R |
| 2554 | of 1893 | United Kingdom | 126/41 R |

Primary Examiner—Carl D. Price
Attorney, Agent, or Firm—Claude F. White

[57] ABSTRACT

A cooking grill for cooking food with heat supplied by a heat source within the grill includes a substantially rectangular box structure which defines an open top chamber, and a lid which is connected to the box structure and is adapted to cover the chamber. A food supporting rack is positioned within said chamber and is connected to said box structure. The food supporting rack covers a first area of the chamber. A first burner is positioned within a second area of the chamber, with the second area being spaced laterally from the first area. With the burner being spaced from the food supporting rack, drippings from the food do not fall onto the burner. This eliminates smoke and excessive flames which can burn the food.

4 Claims, 5 Drawing Sheets

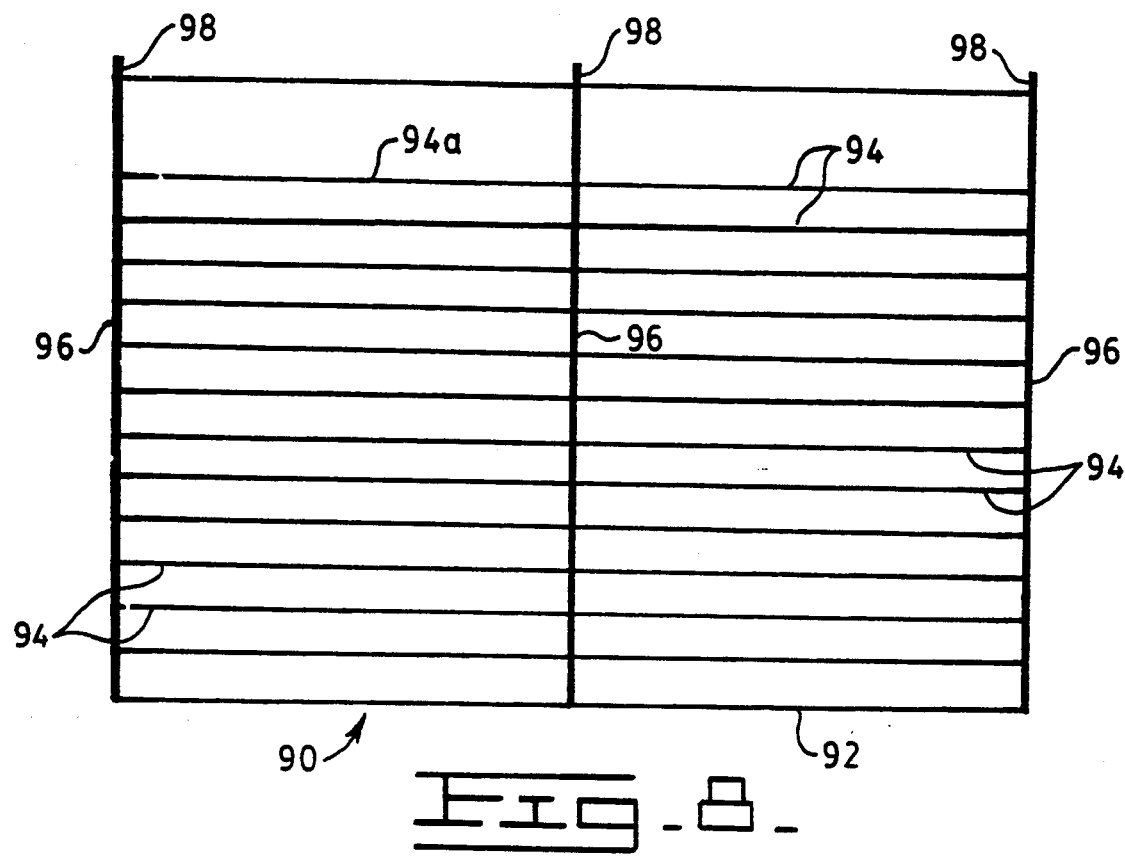
Fig-8-
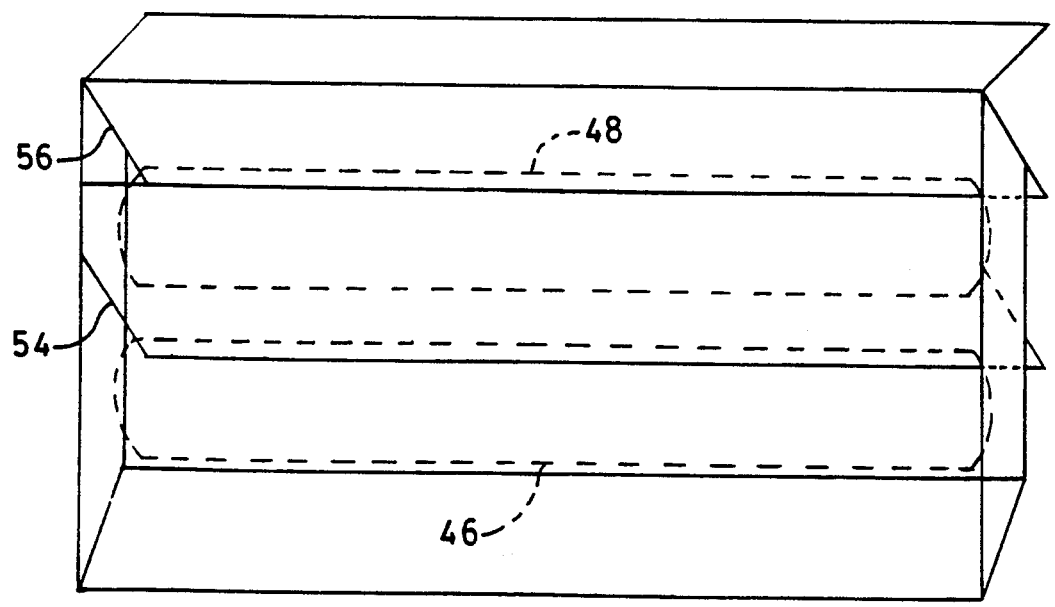
Fig-9-

COOKING GRILL

TECHNICAL FIELD

This invention relates generally to a cooking grill and more particularly to a gas fired grill which has the gas burner spaced from the food supporting rack.

BACKGROUND ART

Conventional gas cooking grills have one or more burner elements associated with the base of the grill. A food supporting rack is positioned within the grill directly above the burners such that the heat and flames flow straight up onto the food. Drippings from the food fall onto the burners where they are rapidly ignited, producing undesirable smoke and excessive flames. These flames often scorch or even ignite the food.

The present invention is directed to overcoming one or more or the problems as set forth above.

DISCLOSURE OF THE INVENTION

In one aspect of the present invention, a cooking grill for cooking food with heat supplied by a heat source within the grill includes a substantially rectangular box which defines a chamber, a lid connected to the box structure for covering and uncovering the chamber, a food supporting means positioned within the chamber, and a burner element positioned within the chamber and spaced laterally from the food supporting means.

Prior art cooking grills have one or more burner elements positioned directly beneath the food supporting rack. In this position, grease and drippings from the cooking food fall directly onto the burners where it is immediately ignited. This produces considerable smoke and excessive flames which scorch or burn the food. Additionally, such drippings adhere to the burners and clog the flame ports of the burners, making them messy and inefficient.

The subject invention provides a cooking grill having the burner positioned out of the path of drippings from the food, thereby providing a cleaner, more efficient cooking unit. The subject cooking grill cooks the food rapidly without burning the food or producing objectionable smoke.

BRIEF DESCRIPTION OF THE DRAWINGS

FIG. 8 is a diagrammatic plan view of a cooking grate for use with the subject cooking grill;

FIG. 9 is a diagrammatic front perspective view of the heat deflectors of the subject invention.

BEST MADE FOR CARRYING OUT THE INVENTION

Figure 1:
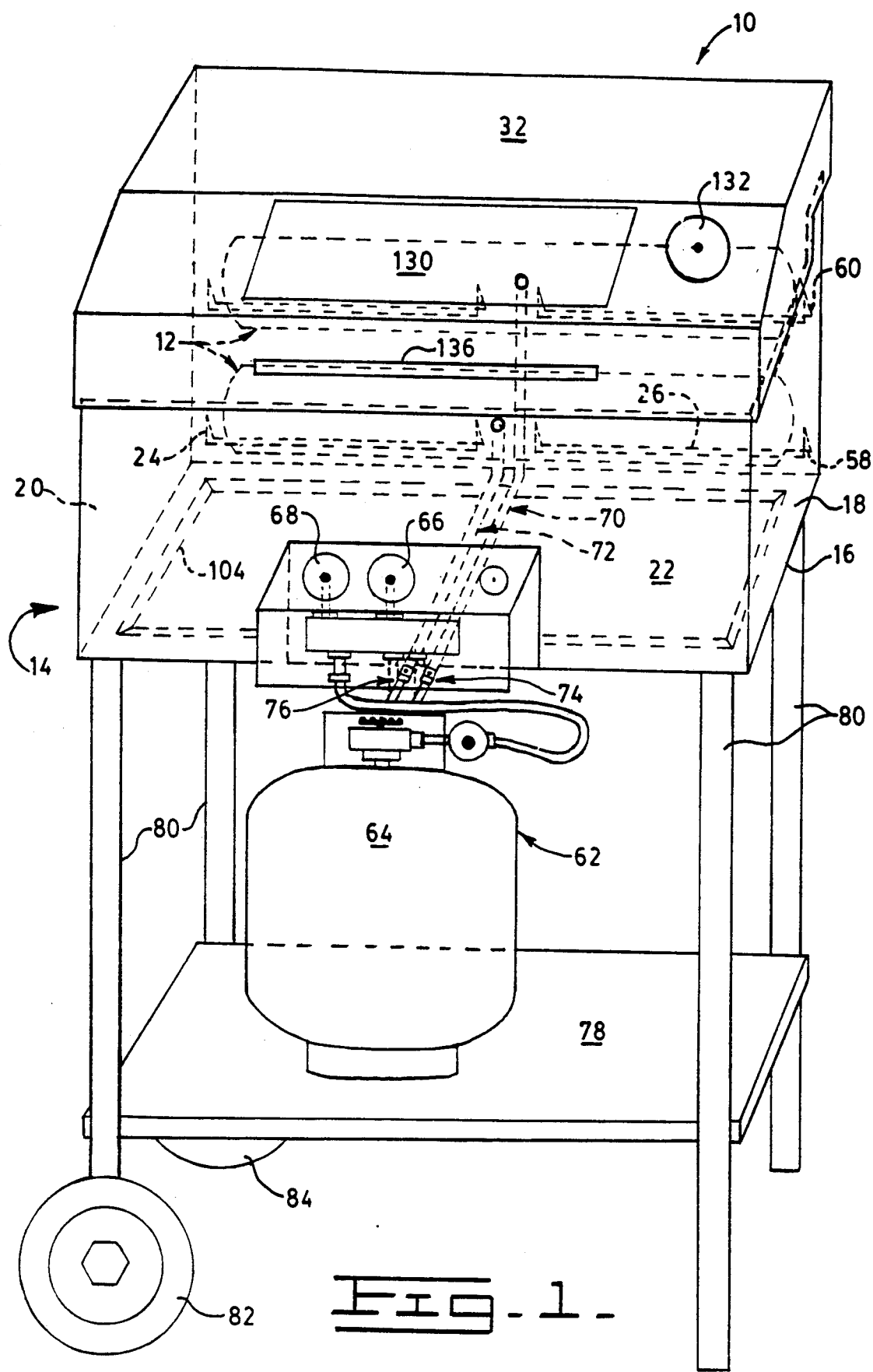
FIG. 1 is a diagrammatic front perspective view of a cooking grill of the subject invention.

With reference to the drawings, a cooking grill 10 for cooking food with heat supplied by a heat source 12 within the grill 10 includes a substantially rectangular metal box structure 14 which has a base 16, first and second side walls 18, 20, a front wall 22, and a rear wall 24. The walls 18, 20, 22, 24 and the base 16 are connected together to define an open top chamber 26. The chamber 26 includes a cooking zone 28 where the food is cooked and a heat zone 30 where the heat source 12 is positioned. The heat zone 30 is spaced laterally from the cooking zone 28 so the heat source 12 is not beneath the cooking zone 28.

The cooking grill 10 further includes a cover or lid 32 which is connected to the rear wall 24 by a continuous type hinge 34. The lid 32 has a front portion 36 and a rear portion 38 to which the hinge 34 is connected. The lid 32 is adapted for movement between a first position 40 at which the chamber 26 is covered or enclosed and a second position at which the chamber 26 is uncovered or open. The front portion 36 of the lid 32 has an angled portion 44 which provides even heat distribution to all parts of the cooking zone 28. First and second burners 46, 48 are positioned within the heat zone 30 and adjacent to the rear wall 24. The burners 46, 48 are positioned horizontally along and associated with the rear wall 24, with the second burner 48 positioned substantially above the first burner 46. Each of the burners 46, 48 has a front face portion 50, 52 respectively, with the face portions 50, 52 being substantially perpendicular to the base 16. The heat from the burners 46, 48 is adapted to be emitted through the front face portions 50, 52 of the burners 46, 48. Although the cooking grill 10 has been illustrated with two burners 46, 48, it is understood that a single burner, or more than two, could be used without departing from the invention.

First and second heat deflectors 54, 56 are positioned within the heat zone 30 and adjacent to respective burners 46, 48. The heat deflectors 54, 56 are positioned above the burners 46, 48 and are angled to deflect heat away from the burners 46, 48 and toward the center of the cooking zone 28 to provide even distubution of heat to the cooking food. Primary air intake for the burners 46, 48 is designed into the rear wall 24 in the form of first and second air intake openings 58, 60. The air intake openings 58, 60 are adjacent respective burners 46, 48 and allow the correct amount of air to the burners 46, 48 for effecient combustion, the air comes in to the back sides 62, 64 of the burners 46, 48 which does not disturb the flames of the burners 46, 48. The air flows directly across the burners 46, 48 and provides efficient and even distubution of the heat to the cooking zone 28. A fuel supply means 62 for supplying fuel to the burners 46, 48 includes a bottle 64 of compressed gas, first and second gas control valves 66, 68, and first and second gas lines 70, 72. Secondary air intake vents 74, 76 are provided in gas lines 70, 72 respectively to adjustably control air to the burners 46, 48. The gas bottle 64 is supported on a shelf 78 between a plurality of support legs 80. Alternatively, the burners 46, 48 could be connected directly to a source of natural gas, if the cooking grill 10 were to be in a permanent type installation. First and second wheels 82, 84 connected to two of the support legs provide means to easily move the grill 10 from one place to another. A handle 86 connected to the first side-wall 18 is used to move the grill 10. The handle 86 also has a flat area 86 which serves as a storage shelf.

The cooking grill includes a first means 90 for supporting the food within the cooking zone 28. The first means 90 includes a cooking grate 92 formed of a plurality of first spaced metal rods 94 and a plurality of second spaced metal rods 96 oriented 90 degrees to the first rods 94 and joined to the underside of the first rods 94. However, one of the rods 94, designated 94a is connected to the underside of the second rods 96. Three of the second rods 96 have extensions 98 which are adapted to extend into openings 100 formed in the rear wall 24. The cooking grate 92 rests on a pair of pins 102 connected to the first and second side walls 18, 20, with the pins 102 extending inwardly into the chamber 26. With the cooking grate 92 installed, the rod 94a is positioned behind the pins 102 and serve to hold the cooking grate in place. The grate 92 is easily removed by lifting up the front portion until the rod 94a clears the pins 102 and pulling the extensions 98 out of the openings 100. A drip pan 104 is adapted to be positioned in the cooking zone 28 directly beneath the cooking grate 92. The drip pan 104 rests on the base 16 and catches any drippings from the food. The drip pan is easily removed from the chamber 26 for easy cleanup.

The grill 10 also includes a second food supporting means 106, which includes a rotisserie 108. First and second slots 110, 112 are formed in the respective first and second side walls 18, 20. First and second brackets 114, 116 are secured to the respective first and second side walls 18, 20 at a position below the respective first and second slots 110, 112. First and second slideable plates 118, 120 are positioned within the respective brackets 114, 116 and are adapted to cover the respective first and second slots 110, 112. The rotisserie 108 includes a rod 122 which extends between and is connected to the first and second plates 118, 120. Each of the brackets 114, 116 include a first rectangular shaped metal plate 124 connected to the respective side wall 18, 20, and a second larger rectangular shaped metal plate 126 connected to the first rectangular shaped plate 124. A groove 128 is thereby formed between the second rectangular shaped plate 126 and the side walls 18, 20 to accomodate the first and second sliding plates 118, 120. The two sliding plates 118, 120 hold the rotisserie 108 and are adapted to slide back and forth in the grooves 128. the rotisserie 108 can therefore be easily adjusted to be the proper distance from the burners 46, 48 for even and proper cooking of the food held by the rotisserie 108. A motor, not shown, can be connected to the rotisserie 108 in any well known manner.

Figure 2:
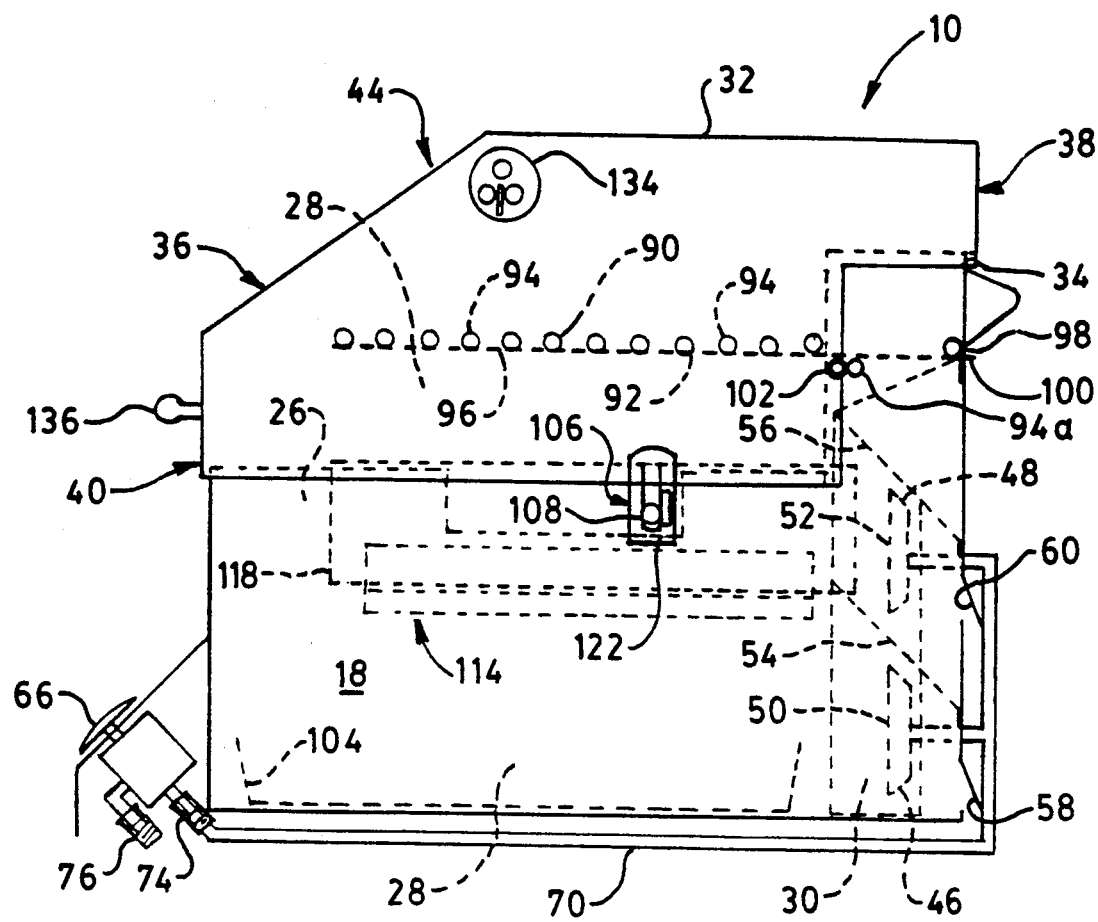
FIG. 2 is a diagammatic side elevational view of a portion of the subject cooking grill with the cover lid closed.
Figure 3:
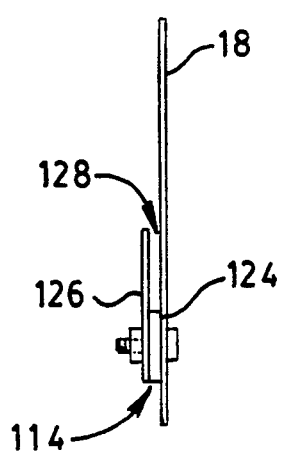
FIG. 3 is a diagrammatic sectional view taken generally along the lines 3—3 of FIG. 2.
Figure 10:
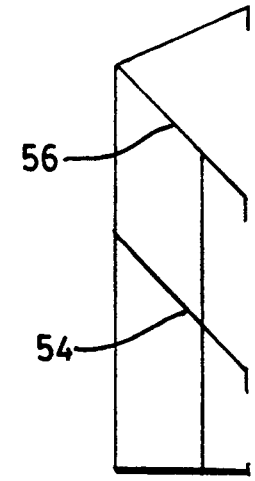
FIG. 10 is a diagrammatic elevational view of the heat deflectors for use with the subject cooking grill.
Figure 4:
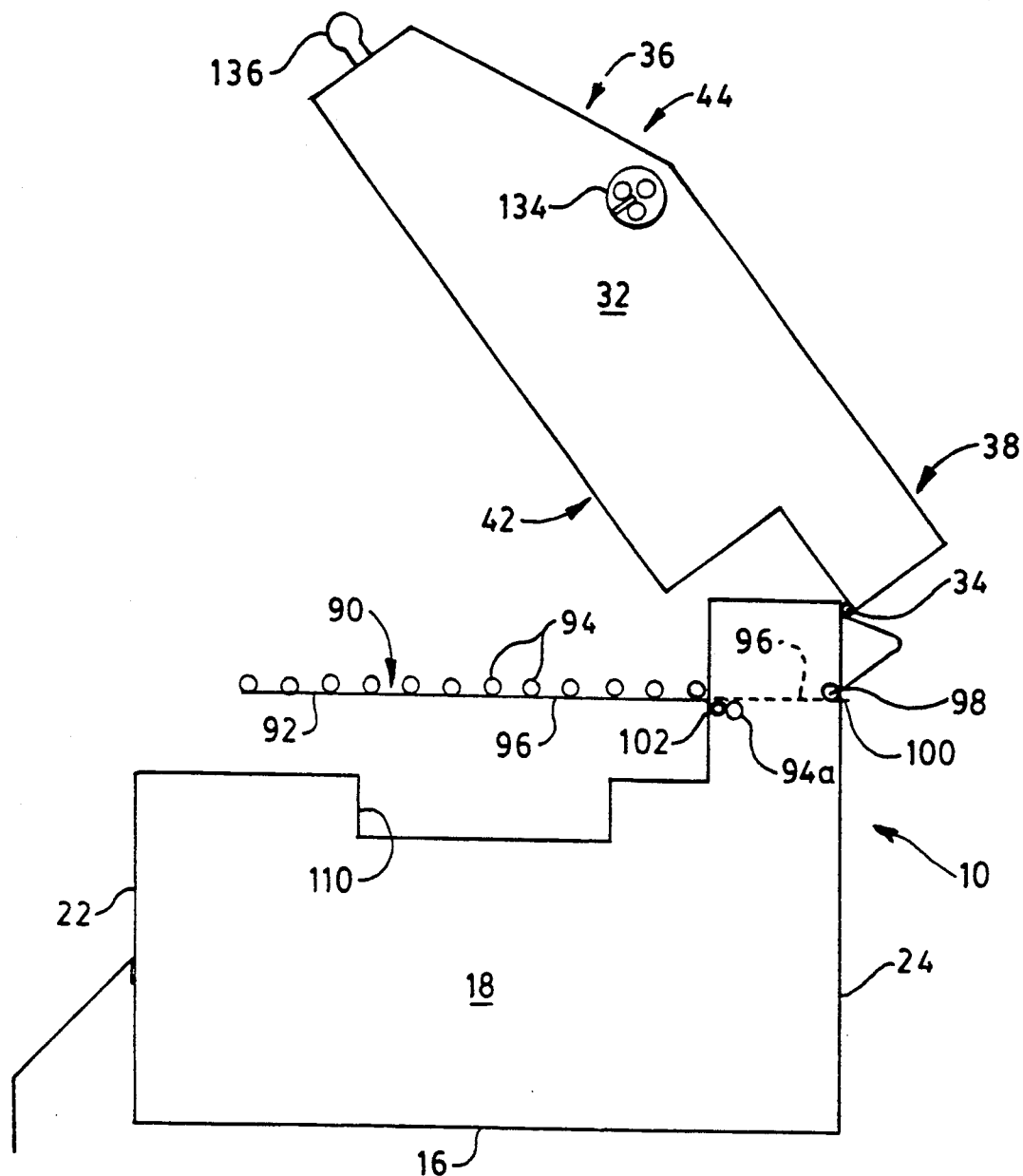
FIG. 4 is a diagrammatic side elevational view of a portion of the subject cooking grill with the cover lid open.
Figure 5:
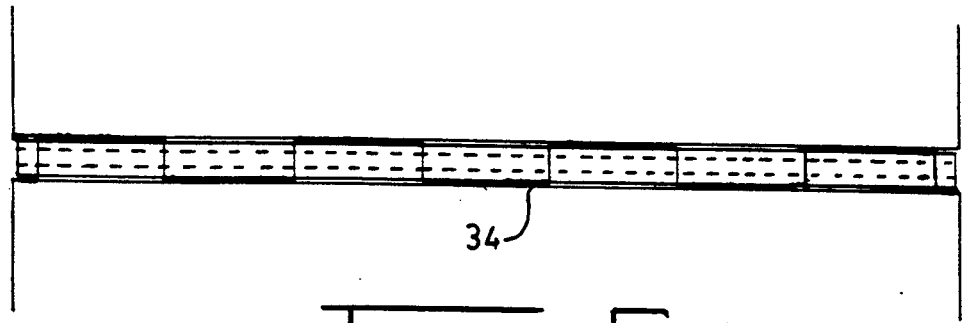
FIG. 5 is a diagrammatic front elevational view of a hinge which joins the cover lid to the cooking grill.
Figure 6:
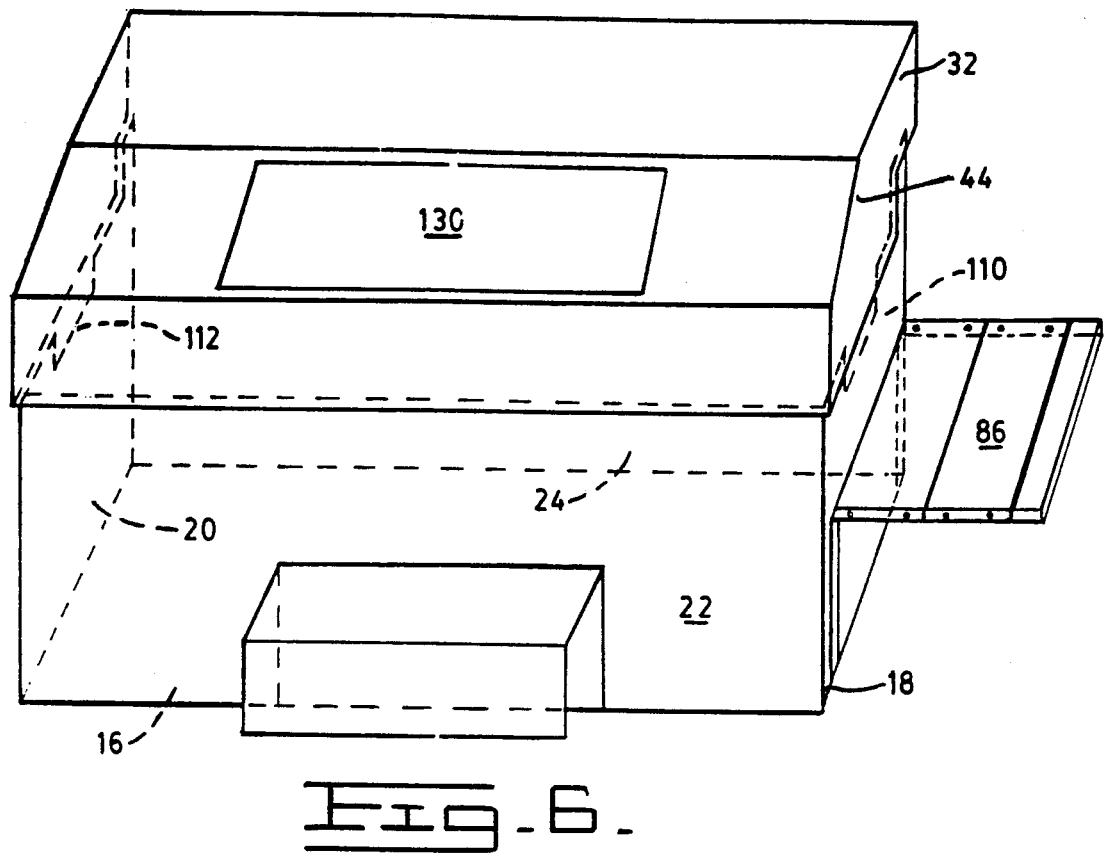
FIG. 6 is a diagrammatic front perspective view of a portion of the subject cooking grill, similar to FIG. 1.
Figure 7:
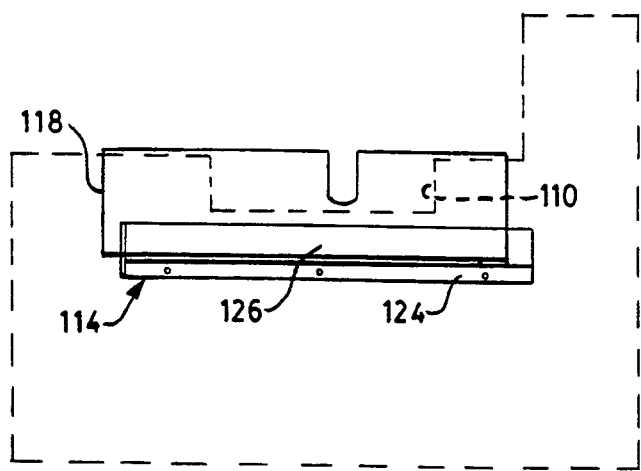
FIG. 7 is a diagrammatic side elevational view of the subject cooking grill, similar to FIG. 4 but showing a sliding plate in the side wall.

With paticular reference to FIGS. 1, 2, and 5, a tempered glass window 130 is provided in the middle portion of the lid 32 in order to observe the food being cooked without having to raise the lid 32, thereby allowing heat to escape. A temperature gage 132 and one or more adjustable air vents 134 are also provided in the lid 32. A non-heat conducting handle 136 is connected to the front portion of the lid 32 and extends outwardly from the lid 32 a sufficient distance to provide easy opening and closing of the lid 32.

INDUSTRIAL APPLICABILITY

With reference to the drawings, the subject cooking grill 10 is particularly useful for cooking meats and other foods in the out of doors and at locations remote from a residence. The interior chamber 26 of the grill 10 is divided into a cooking zone 28 and a heat zone 30, with the heat zone 30 spaced laterally from the cooking zone 28. The burners 46, 48 are positioned within the heat zone 30 so they are not beneath the cooking zone 28. In this location and position of the burners 46, 48, the cooking food is never directly over the burners 46, 48. Any drippings from the food therefore does not fall onto the burners 46, 48 where it could produce smoke and flare-ups, which cold burn the food. Also, the burners 46, 48 do not become clogged or covered with food drippings. This makes clean-up easier and prolongs the life of the burners 46, 48. The heat deflectors 54, 56 are positioned within the heat zone 30 and over each burner 46, 48 to deflect and channel the heat to the cooking zone 28 to provide even distubtion of the heat.

Other aspects, objects and advantages of this invention can be obtained from a study of the drawings, the disclosure, and the appended claims.

We claim:
1. A cooking grill for cooking food with heat supplied by a heat source within the grill, comprising:
   a substantially rectangular metal box structure having a base, first and second side walls, a front wall, and a rear wall, said walls and base being connected to define an open top chamber;
   a food supporting cooking grate supported by said box structure and positioned above said chamber, said chamber defining a cooking zone substantially directly beneath said cooking grate, said chamber further defining a single heat zone adjacent said rear wall and spaced from said cooking zone;
   a lid connected to said box structure and adapted to cover said chamber in a first position and to uncover said chamber in a second position;
   a burner positioned within said heat zone and adjacent said rear wall; and
   first and second slots formed in respective first and second side walls, first and second brackets secured to said respective first and second side walls and positioned below a respective slot, and first and second plates positioned within a respective bracket and adapted to cover said respective first and second slots.
2. A cooking grill, as set forth in claim 1, including a second burner positioned within said heat zone and adjacent said rear wall, said second burner being positioned above said first burner.
3. A cooking grill, as set forth in claim 2, including first and second heat deflectors positioned adjacent respective said first and second burners.
4. A cooking grill, as set forth in claim 1, including a first air opening in the rear wall adjacent said first burner.

* * * * *